US007827026B2

(12) United States Patent
Brun et al.

(10) Patent No.: US 7,827,026 B2
(45) Date of Patent: Nov. 2, 2010

(54) BILINGUAL AUTHORING ASSISTANT FOR THE "TIP OF THE TONGUE" PROBLEM

(75) Inventors: Caroline Brun, Grenoble (FR); Marc Dymetman, Grenoble (FR); Frederique Segond, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 1365 days.

(21) Appl. No.: 11/018,758

(22) Filed: Dec. 21, 2004

(65) Prior Publication Data

US 2006/0136223 A1      Jun. 22, 2006

(51) Int. Cl.
    *G06F 17/20* (2006.01)
(52) U.S. Cl. .................. 704/2; 704/4; 704/5; 704/7; 704/8
(58) Field of Classification Search .............. 704/2–8; 715/255, 264, 265
    See application file for complete search history.

(56) References Cited

U.S. PATENT DOCUMENTS

| | | | |
|---|---|---|---|
| 5,642,522 A | 6/1997 | Zaenen et al. | |
| 5,845,143 A | 12/1998 | Yamauchi et al. | |
| 6,393,389 B1 | 5/2002 | Chanod et al. | |
| 6,405,162 B1 | 6/2002 | Segond et al. | |
| 6,598,015 B1 | 7/2003 | Peterson et al. | |
| 7,107,204 B1 * | 9/2006 | Liu et al. ................ | 704/2 |
| 2003/0074187 A1 | 4/2003 | Ait-Mokhtar et al. | |

FOREIGN PATENT DOCUMENTS

WO      WO 99/57651       11/1999

WO      WO 01/82119       11/2001

OTHER PUBLICATIONS

Aimelet, E., Lux, V., Jean, C., Segond, F., "WSD evaluation and the looking-glass", Conference TALN 1999, Cargese, Jul. 12-17, 1999.

Ait-Mokhtar, S., Chanod, J-P., "Incremental Finite-State Parsing", Proceedings of Applied Natural Language Processing 1997, Washington, DC, Apr. 1997.

Ait-Mokhtar, S., Chanod, J-P., "Subject and Object Dependency Extraction Using Finite-State Transducers", Proceedings of the Workshop on Automatic Information Extraction and the Building of Lexical Semantic Resources, ACL, Madrid, Spain, 1997, p. 71-77.

(Continued)

*Primary Examiner*—David R Hudspeth
*Assistant Examiner*—Lamont M Spooner
(74) *Attorney, Agent, or Firm*—Fay Sharpe LLP

(57) ABSTRACT

A bilingual authoring apparatus includes a user interface (20) for inputting partially translated text including a text portion in a source language and surrounding or adjacent text in a target language. A bilingual dictionary (34) associates words and phrases in the target language and words and phrases in a source language. A context sensitive translation tool (30, 32, 38) communicates with the user interface, receives the partially translated text, and provides at least one proposed translation in the target language of the text portion in the source language. The at least one proposed translation in the target language is derived from the bilingual dictionary based on contextual analysis of at least a portion of the partially translated text.

17 Claims, 6 Drawing Sheets

OTHER PUBLICATIONS

Ait-Mokhtar, A., Chanod, J-P., Roux, C., "A Multi-Input Dependency Parser", Seventh International Workshop on Parsing Technologies, Oct. 17-19, 2001, Beijing.

Ait-Mokhtar, S., Chanod, J-P., Roux, C., "Robustness Beyond Shallowness: Incremental Dependency Parsing", Special Issue of *Natural Language Engineering*, vol. 8, Nos. 2/3, 2002 Cambridge University Press, UK, p. 121-144.

Ballim, A., Coray G, A. Linden, A., and Vanoirbeek, C. The Use or Automatic Alignment on Structured Multilingual Documents. In J. Andre et H. Brown (editor), Electronic Publishing, Artistic Imaging, and Digital Typography: proceedings/Seventh International Conference on Electronic Publishing, EP'98 Document Manipulation and Typography, Saint-Malo, France, Apr. 1998. Springer-Verlag, p. 464-475.

Bauer, D., Segond, F., Zaenen, A., "LOCOLEX, the Translation Rolls off Your Tongue", Proceedings of ACH-ALLC '95, Santa Barbara, CA, Jul. 11-15, 1995, p. 6-9.

Beesley, K.R., Karttunen, L., "Finite State Morphology", CSLI Studies in Computational Linguistics, CSLI Publications, Stanford, CA 2003.

Bille, P., "Tree Edit Distance, Alignment Distance and Inclusion", Technical Report TR-2003-23, IT University of Copenhagen, ISSN 1600-6100, Mar. 2003, ISBN 87-7949-032-8, p. 1-22.

Breidt, E., Segond, F., Valetto, G., "Formal Description of Multi-Word Lexemes with the Finite-State Formalism IDAREX", Proceedings of COLING, Copenhagen, Aug. 5-9, 1995, p. 1036-1040.

Breidt, E., Segond, F., Valetto, G., "Local grammars for the description of multi-word lexemes and their automatic recognition in texts", COMPLEX96, Budapest, Sep. 1996.

Bresnan, J., Kaplan, R.M., "Lexical-functional grammar: A formal system for grammatical representation", The MIT Press Series on Cognitive Theory and Mental Repr., Cambridge, MA, 1982, p. 173-281.

Brill, E., "A simple rule-based part of speech tagger", Third Annual Conference on Applied Natural Language Processing, ACL. 1992, p. 152-155.

Brun, C., "A client/server architecture for word sense disambiguation", Proceedings of the 18$^{th}$ International Conference on Computational Linguistics (COLING 2000), Saarbrucken, Allemagne, Jul. 31-Aug. 4, 2000, p. 132-138.

Brun, C., Segond, F., "Semantic Encoding of Electronic Documents", *International Journal of Corpus Linguistic*, vol. 6, No. 1, 2001.

Casillas, A., Abaitua, J., Martinez, R.; "DTD-Driven Bilingual Document Generation", International Natural Language Generation Conference, Mitzpe Ramon, Israel, 2000, p. 32-38.

Casillas, A., Martinez, R., "Bitext segmentation and alignment for specialized document composition", *Traitement automatioue de la langue* (TAL), Vol. 42—No. 2/2001, p. 441-458.

Chomsky, N., "Syntactic Structures", Haag, Mouton, 1957.

Dini, L., DiTomaso, V., Segond, F., "Error Driven Word Sense Disambiguation", Proceedings of COLING/ACL98, Montreal, Canada, 1998, p. 320-324.

Dini, L., DiTomaso, V., Segond, F., "GINGER II: An example-driven word sense disambiguator", *Computers and the Humanities*, Special Issue on Senseval, vol. 34, No. 1-2, Apr. 2000, Kluwer Academic Publishers. The Netherlands p. 121-126.

Fellbaum, C., "Wordnet: An Electronic Lexical Database", The MIT Press, (Language, speech, and communication series), Cambridge, MA, 1998.

Gale, W.A., Church, K.W., "A Program for aligning sentences in bilingual corpora." 29$^{th}$ Annual Meeting of the Association for Computational Linguistics (ACL), Berkeley, CA, Jun. 1991, p. 177-184.

Gandrabur, S., Foster, G., "Confidence estimation for translation prediction", Seventh Conference on Natural Language Learning, Edmonton, Canada, Jun. 2003.

Ide, N., Veronis, J., "Word Sense Disambiguation: The state of the art", Computational Linguistics, vol. 24, No. 1, 1988.

Kupiec, J., "Robust part-of-speech tagging using a hidden Markov model", *Computer Speech and Language*, vol. 6, 1992, p. 225-242.

Navarro, G., "A guided tour to approximate string matching", ACM Computing Surveys, vol. 33 No. 1:31-88, 2001.

Navarro, G., Yates, R., Sutinen, E., Tarhio, J., "Indexing Methods for approximate string matching", IEEE Data Engineering Bulletin, vol. 24 No. 4: 19-27, 2001.

Pereira, F. C. N., Warren, D.H.D., "Definite clause grammars for language analysis—a survey of the formalism and a comparison with augmented transition networks", *Artificial Intelligence*, vol. 13, 1980, p. 231-278.

Poibeau, T., "Deconstructing Harry—une evaluation des systemes de reperage d-entites nommees", Revue de Societe d'electronique, Thales, 2001.

Romary, L., Bonhomme, P., "Parallel alignment of structured documents", Text Speech and Language Technology, Parallel Text Processing, 2000 Kluwer Academic Publishers, The Netherlands, p. 201-217.

Vergne, J., Pages, P., "Synergy of syntax and morphology in automatic parsing of French language with a minimum of data, Feasibility study of the method", Proceedings of COLING '86, Bonn, Aug. 25-29, 1986, p. 269-271.

U.S. Appl. No. 11/018,891, filed Dec. 21, 2004, Lux-Pogodalla, et al.
U.S. Appl. No. 11/018,892, filed Dec. 21, 2004, Caroline Brun.

* cited by examiner

BILINGUAL AUTHORING ASSISTANT FOR THE "TIP OF THE TONGUE" PROBLEM

BACKGROUND

The following relates to the linguistic arts. It finds particular application in conjunction with translation of text from a source language to a target language, and will be described with particular reference thereto. However, it is to be appreciated that the following is also amenable to other like applications, such as electronic foreign language learning tools.

A common problem in the authoring of text translations is the "tip of the tongue" problem. The author is proceeding apace in writing the translation, but comes up against a word or phrase in the source language which is unfamiliar to the author, or which the author is unable to effectively express in the target language.

To address this problem, the author may consult a bilingual dictionary, which may be in either paper or electronic form. In either case, the author must stop work and access the bilingual dictionary. A heavily abridged bilingual dictionary may not suffice, since the "tip of the tongue" problem typically arises in non-standard situations such as collocations, idiomatic phrases, and so forth. Such complex or non-standard forms are sometimes omitted from abridged dictionaries, and so a fairly comprehensive bilingual dictionary should be consulted.

A comprehensive bilingual dictionary has extensive entries for each word, typically including a substantial number of example source language contexts and corresponding target language translations, collocations, and so forth. If a word has more than one meaning or can be used as more than one part of speech, then each possible usage is extensively detailed. Still further, the author may need to consult several entries if the untranslated portion is a phrase including several words. Such searching can become time consuming and burdensome for the author.

The following copending, commonly assigned applications: Bi-Dimensional Rewriting Rules for Natural Language Processing (Xerox ID 20040117-US-NP, Ser. No. 11/018, 892 filed Dec. 21, 2004) and Retrieval Method For Translation Memories Containing Highly Structured Documents (Xerox ID 20031674-US-NP, Ser. No. 11/018,891 filed Dec. 21, 2004) are herein incorporated by reference.

BRIEF DESCRIPTION

In accordance with one aspect, a bilingual authoring apparatus is disclosed. A user interface is provided for inputting partially translated text including a text portion in a source language and surrounding or adjacent text in a target language. A bilingual dictionary associates words and phrases in the target language and words and phrases in a source language. A context sensitive translation tool communicates with the user interface, receives the partially translated text, and provides at least one proposed translation in the target language of the text portion in the source language. The at least one proposed translation in the target language is derived from the bilingual dictionary based on contextual analysis of at least a portion of the partially translated text.

In accordance with another aspect, a bilingual authoring method is provided. Partially translated text is received from an associated user. The partially translated text includes a text portion in a source language and surrounding or adjacent text in a target language. The partially translated text is identified. At least one proposed translation in the target language of the text portion in the source language is derived based on contents of a bilingual dictionary and contextual analysis of at least a portion of the partially translated text. The at least one proposed translation is displayed to the associated user.

In accordance with yet another aspect, a storage medium stores instructions which when executed by an electronic processor perform a method including: (i) receiving partially translated text including a text portion in a source language and surrounding or adjacent text in a target language; and (ii) deriving at least one proposed translation in the target language of the text portion in the source language based on contents of a bilingual dictionary and contextual analysis of at least a portion of the partially translated text.

DETAILED DESCRIPTION

Figure 1:
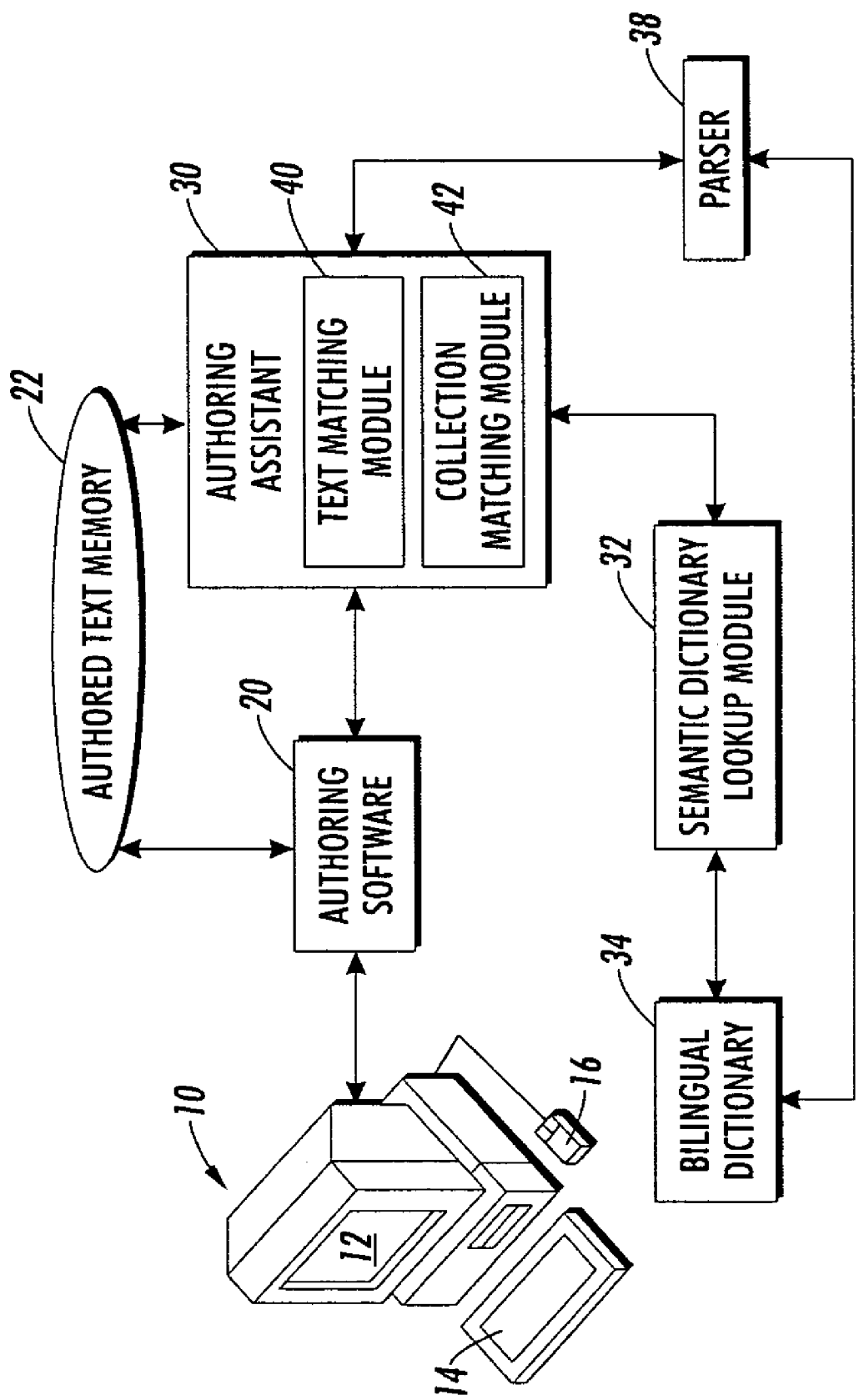
FIG. 1 diagrammatically shows a bilingual authoring apparatus including an example authoring assistant.

With reference to FIG. 1, an author prepares authored text in a target language based on a source document written in a source language. In the illustrative examples provided herein, the source language is French and the target language is English; however, the source and target languages can be substantially any two different natural languages. The author uses a suitable user interface 10 that includes a display 12 and one or more input devices such as an illustrated keyboard 14 and mouse 16. Other suitable input devices include, for example, a trackball, a voice recognition unit, a keypad, a touch-sensitive screen, or so forth. The user interface 10 operates under the control of authoring software 20 which typically incorporates word processing or text editing capability. The authored text in the target language is typically temporarily stored during editing in an authored text memory 22, and may be permanently stored to a magnetic disk, optical disk, non-volatile electronic storage, or so forth (elements not shown). The authored text also may be sent over the Internet or a local area network, printed, or otherwise utilized.

As the author works, he or she may encounter a "tip of the tongue" problem, in which the author comes up against a word or phrase in the source language which is unfamiliar to the author, or which the author is unable to effectively express in the target language. In such a situation, the author suitably inputs the untranslated text in the source language within the context of the target language authored text, and calls up an authoring assistant 30. The invoked authoring assistant 30 runs concurrently with the authoring software 20 at least when invoked so as to provide suggested translations in the target language for the entered text in the source language.

If the text in the source language is a phrase or other sequence of words or tokens providing context, the authoring assistant 30 includes or accesses a semantic dictionary lookup module 32 that references a bilingual lexicon or dictionary 34 to perform a contextual lookup of the text in the source language. The contextual lookup determines one or more likely translations of the phrase in the source language. The authoring assistant 30 communicates these one or more proposed translations to the author, for example via the display 12.

The semantic dictionary lookup module 32 performs monolingual lexical, syntactic, and semantic analysis of the phrase in the source language in order to determine one or more proposed translations in the target language. Typically the semantic dictionary lookup module 32 parses the phrase with reference to source language entries of the dictionary 34. The parsing breaks the phrase into tokens representative of words, punctuation, or the like, and determines parts-of-speech and optionally also higher order categorizations for each of the tokens using syntactic analysis employing a monolingual grammar typically described by rewriting rules descriptive of common combinations of parts of speech or higher order categories. The parsing is optionally also augmented by limited semantic analysis, such as identification of collocations listed in the lexicon or dictionary 34. Based on the parts-of-speech and optional higher order token categorizations, the semantic dictionary lookup module 32 determines likely translations in the target language using example context translations or other semantic information contained in the bilingual lexicon or dictionary 34.

The semantic dictionary lookup module 32 can have varying levels of functionality, and can be embodied by various semantic dictionary lookup systems and methods. In some embodiments, for example, the semantic dictionary lookup module 32 employs functionality set forth in U.S. Pat. No. 5,642,522 issued to Zaenon and Karttunen and in "LOCOLEX: Translation Rolls off Your Tongue." F. Segond, D. Bauer, and A. Zaenen, proceedings of ACH-ALLC 95, Santa Barbara, USA, July 1995. This functionality matches complete monolingual phrases in the source language to propose translations in the target language, using a combination of lemmatization, part of speech disambiguation, and multi-word phrase matching techniques. The multi-word phrase matching of these approaches is restricted to "idiomatic expressions" or part of speech disambiguation.

In other embodiments, the semantic dictionary lookup module 32 is embodied by a version of the Xerox semantic dictionary lookup, which is available from Xerox Research Centre Europe (XRCE, located in Grenoble, France). This approach uses information available in dictionaries including collocation information, examples of usage of the word, and so forth, to perform a lookup of a word relative to its context and to perform disambiguation. A similar semantic dictionary lookup method is described in U.S. Pat. No. 6,405,162 issued to F. Segond and C. Brun.

The semantic dictionary lookup module 32 combines semantic, syntactical, and lexical analyses of the text in the source language in a monolingual fashion to determine the likely meaning of the words in the source language phrase, and employs translations provided by the bilingual dictionary to come up with proposed translations in the target language. A multiple word or multiple token phrase in the source language provides sufficient context to perform the syntactic and semantic analyses monolingually in the source language.

In some cases, however, the text in the source language consists of a single word or token that does not provide sufficient context to perform monolingual syntactic and semantic analysis in the source language. In such cases, the semantic dictionary lookup module 32 cannot directly process the word or token, beyond providing lexical information in the form of a typically lengthy entry for the word or token contained in the bilingual dictionary. A lengthy lexicon entry is difficult to display on the limited area of the display 12, and the large amount of displayed information limits the usefulness of the lengthy lexicon entry to the author.

Accordingly, the authoring assistant 30 performs syntactic and semantic analysis of surrounding or adjacent text authored in the target language, and uses that contextual information to propose one or more target language translations for the single word or token in the source language. Toward this end, the authoring assistant 30 includes or accesses a parser 38 to parse the surrounding or adjacent text authored in the target language using a suitable target language grammar. During the parsing, the word or token in the source language is treated as an unknown token. Such parsing may enable the part-of-speech of the word or token in the source language to be guessed partially or even unambiguously identified. In some cases, unambiguous identification of the part of speech by itself may enable proposal of an unambiguous target language translation of the word or token.

In other cases, the parsing by itself is insufficient to provide a sufficiently short list of one or more translations for proposal to the author. In these cases, a text matching module 40 compares the surrounding or adjacent text in the target language with translations of semantic examples provided in the bilingual dictionary 34 in an attempt to identify a match. If such a match is found, then the target language translation of that semantic example is proposed to the author as a possible translation. In some embodiments, the text matching module 40 further accesses the bilingual lexicon or dictionary 34 to identify synonyms in the target language for words in the translations of the semantic examples given in the dictionary 34, thus expanding the available semantic data for comparison. In a similar fashion, a collocation matching module 42 of the authoring assistant 30 compares translations in the source language of surrounding or adjacent words of the authored text with lexical or semantic collates identified in the bilingual lexicon or dictionary 34; successful collocation matches provide additional proposed translations.

The authoring assistant 30 illustrated in FIG. 1 is an example. Those skilled in the art can readily adapt the illustrated authoring assistant 30 to comport with specific applications. For example, while the illustrated authoring assistant 30 accesses the external semantic dictionary lookup module 32 and parser 38, one or both of these components can instead be integrated into the authoring assistant. The authoring assistant 30 can be integrated with the authoring software 20, for example as an add-on tool of a word processor. In some embodiments, the user interface 10 is a computer, handheld personal data assistant (PDA), or the like which includes on-board non-volatile storage and memory, and the authoring software 20 and authoring assistant 30 are stored and executed on-board. In other embodiments, one or both of the authoring software 20 and authoring assistant 30 are remotely disposed and are accessed by the user interface 10 via the Internet, a local area network, or another wired or wireless communication pathway. These are only example adaptations—the skilled artisan can readily make other adaptations.

Figure 2:
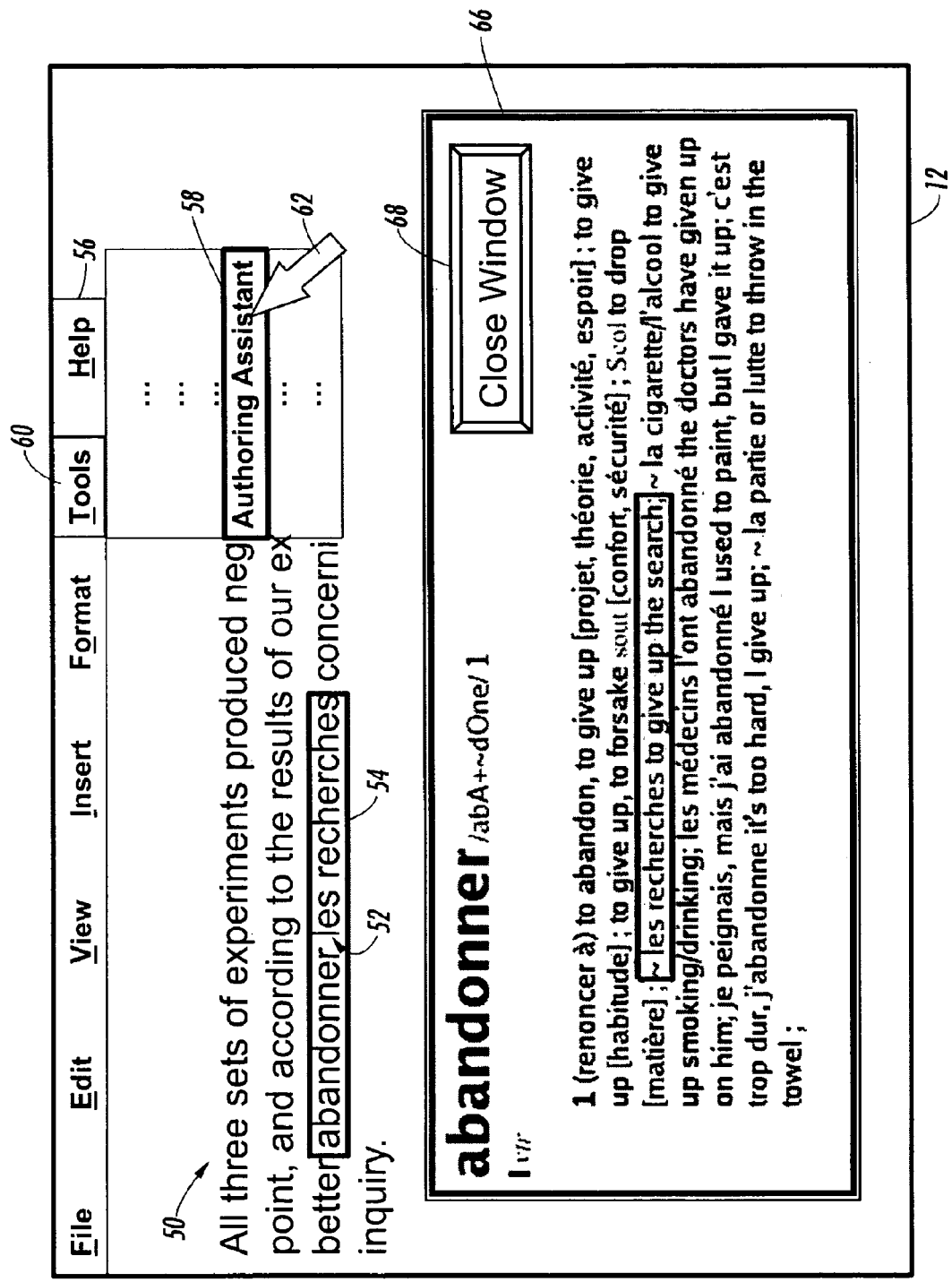
FIGS. 2 and 3 show two example word processing or text editing displays in which the authoring assistant has been accessed.

With reference to FIG. 2, one suitable user interfacing with the authoring assistant 30 is illustrated. The author employs the user interface 10 to type in authored partially translated text 50 which is primarily in the target language (English in the illustrated example) but which also includes a text portion 52 in the source language (French in the illustrated example). In FIG. 2, the author starts by entering the authored English translation text:

"All three sets of experiments produced negative results. At this point, and according to the results of our experiments, we shall better . . . "

At that point, the author encounters the French source language text portion 52:

"abandonner les recherches"

which the author does not readily know how to properly translate. Accordingly, the author types in the untranslated text portion 52, and then continues to author subsequent text in the English language including in FIG. 2:

" . . . concerning this direction of inquiry."

At this point, the author invokes the authoring assistant 30 to provide proposed translations for the French text portion 52: "abandonner les recherches."To do so, the author uses the mouse 16, keyboard 14, or other input device to mark the French text portion 52: "abandonner les recherches" by highlighting 54 (diagrammatically indicated in FIG. 2 by a box surrounding the French text portion 52). In other embodiments, the author indicates the untranslated source language text in other ways, such as by bracketing the text with suitable tags: <Lang:French>abandonner les recherches</Lang>. In yet other embodiments, the authoring assistant 30 operates concurrently with the authoring software 20 to monitor the input of authored text for words of the source language and, upon detecting entry of the French text portion 52, automatically analyzes it and provides one or more proposed translations.

In the embodiment illustrated in FIG. 2, after highlighting the French text portion 52, the author accesses a word processing menu 56 and selects the "Authoring Assistant" option 58 from a drop-down menu accessed via the top-level "Tools" menu option 60 to apply the authoring assistant 30 to the highlighted French text portion 52. In the illustrated approach, the author employs a mouse pointer 62 operated by the mouse 16 to make the menu selections.

The invoked authoring assistant 30 recognizes the French text portion 52 as a multiple-word phrase providing substantial contextual information in the French language. Accordingly, the authoring assistant 30 passes the French text portion 52 to the semantic dictionary lookup module 32, which in turn accesses the bilingual lexicon or dictionary 34 to locate the entry for "abandoner". In the example embodiments described herein, the bilingual dictionary 34 employed is the Oxford-Hachette Bilingual dictionary (Correard M.-H., Grundy V., Eds., Oxford-Hachette French Dictionary, Oxford-Hachette, Paris, 1994); however, substantially any electronic bilingual lexicon or dictionary supporting at least the source and target languages can be employed.

In FIG. 2, the authoring assistant 30 brings up a pop-up window 66 inside of which the dictionary entry for "abandoner" is displayed. Moreover, the semantic dictionary lookup module 32 performs semantic analysis of the translation examples and identifies the example source context: "~les recherches" as being particularly close (indeed identical, in this case) to the untranslated French text portion 52. Accordingly, the authoring assistant 30 highlights this entry, including its English translation "to give up the search" as a proposed translation for the untranslated French portion 52. Additionally, the pop-up window 66 generated by the authoring assistant 30 includes a "Close Window" option button 68 which when selected by the mouse 16 or other input device closes the pop-up window 60.

Figure 3:
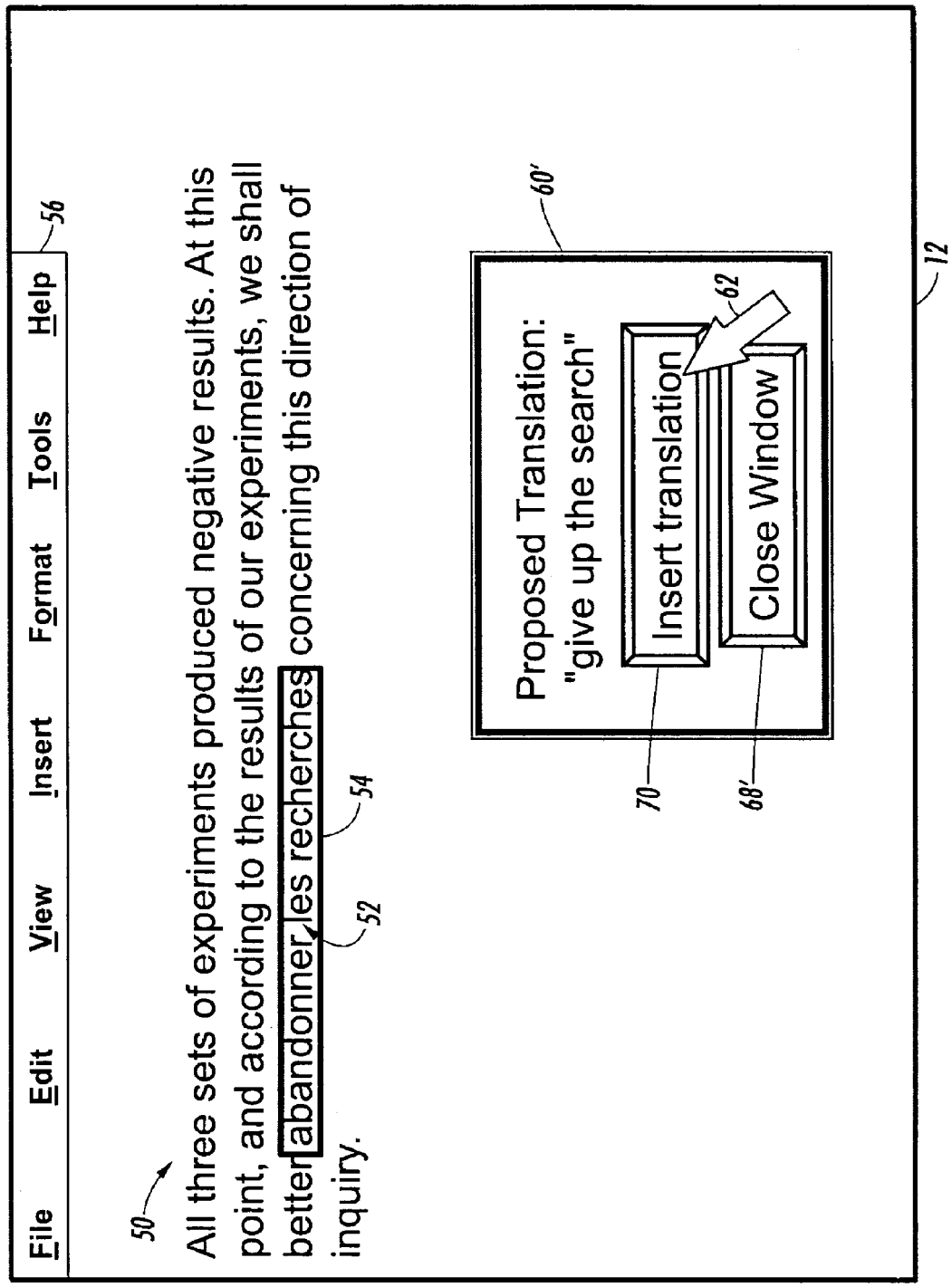

With reference to FIG. 3, the authoring assistant 30 optionally proposes the translation in a more concise form in a pop-up window 60' which displays only the proposed translation "give up the search", along with a "Close Window" option 68' and an "Insert translation" option button 70. Selection of the "Insert translation" option button 70 using the mouse pointer 62 or another input device causes the untranslated French text portion 52 to be replaced by the proposed translation "give up the search" in the authored partially translated text 50. In the example of FIG. 3, only one translation is proposed; if, however, more than one translation is proposed, then the author uses the mouse pointer 62 to select one of the translations, thus causing the selected translation to replace the untranslated text in the source language.

Figure 4:
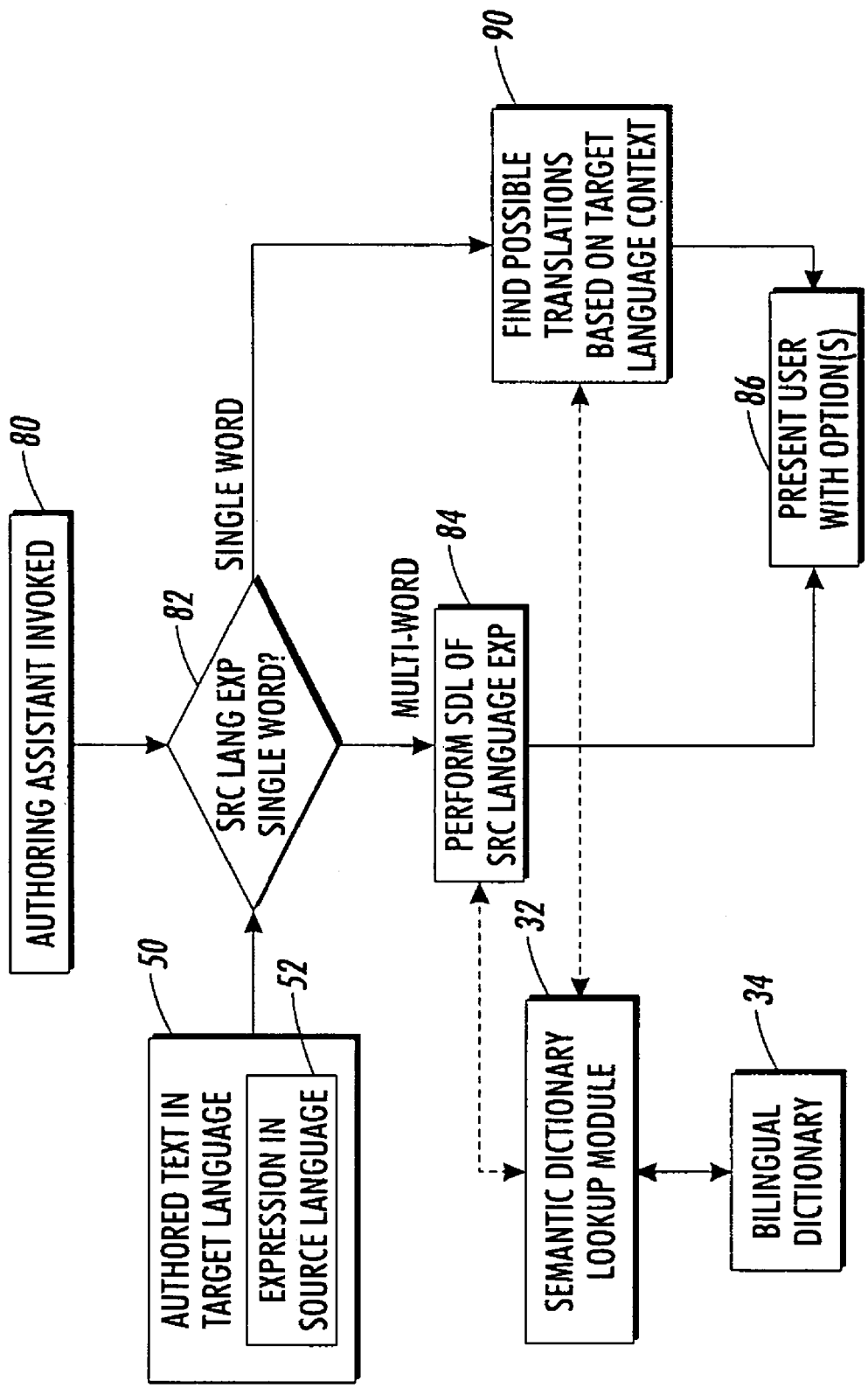
FIG. 4 flowcharts processing performed by the example authoring assistant of FIG. 1.

With reference to FIG. 4, a flow chart of the processing suitably performed by the authoring assistant 30 is provided. The authoring assistant 30 is invoked in a process operation 80, for example via a menu as illustrated in FIG. 2, using a hotkey combination (such as <ALT><CTRL>T, for example), by automated recognition of untranslated text entered in the source language, or by another mechanism. In a decision operation 82, the authoring assistant 30 first determines whether or not the text expression 52 in the source language has enough context to enable monolingual semantic analysis. In the operation 82, this determination is made as follows: If the source language expression is multi-word, then it is assumed that sufficient context in the source language is provided to enable meaningful monolingual semantic analysis in the source language. In some other embodiments, more complex decision criteria are employed. For example, more complex criteria may indicate that a combination of two words in the source language is insufficient in at least some cases to provide sufficient context for monolingual contextual analysis in the source language.

If the decision operation 82 identifies the expression in the source language as multi-word, a semantic dictionary lookup is performed in a process operation 84. This operation 84 is performed by forwarding the text portion in the source language 52 to the semantic dictionary lookup module 32 to perform the semantic analysis. The one or more proposed translations returned by the semantic dictionary lookup module 32 are presented to the user in process operation 86, for example by displaying them on the screen using one of the formats shown in FIG. 2 or FIG. 3.

On the other hand, if the decision operation 82 identifies the expression in the source language as a single word, then a monolingual semantic dictionary lookup is not particularly helpful in view of the lack of context in the source language. Accordingly, in a process operation 90 the authoring assistant 30 finds possible translations based on the context provided by the surrounding or adjacent text in the target language, and proposes one or more such translations to the user in the process operation 86.

Having described a suitable processing flow for the authoring assistant 30, some examples of operation on multi-word expressions is described.

Figure 5:
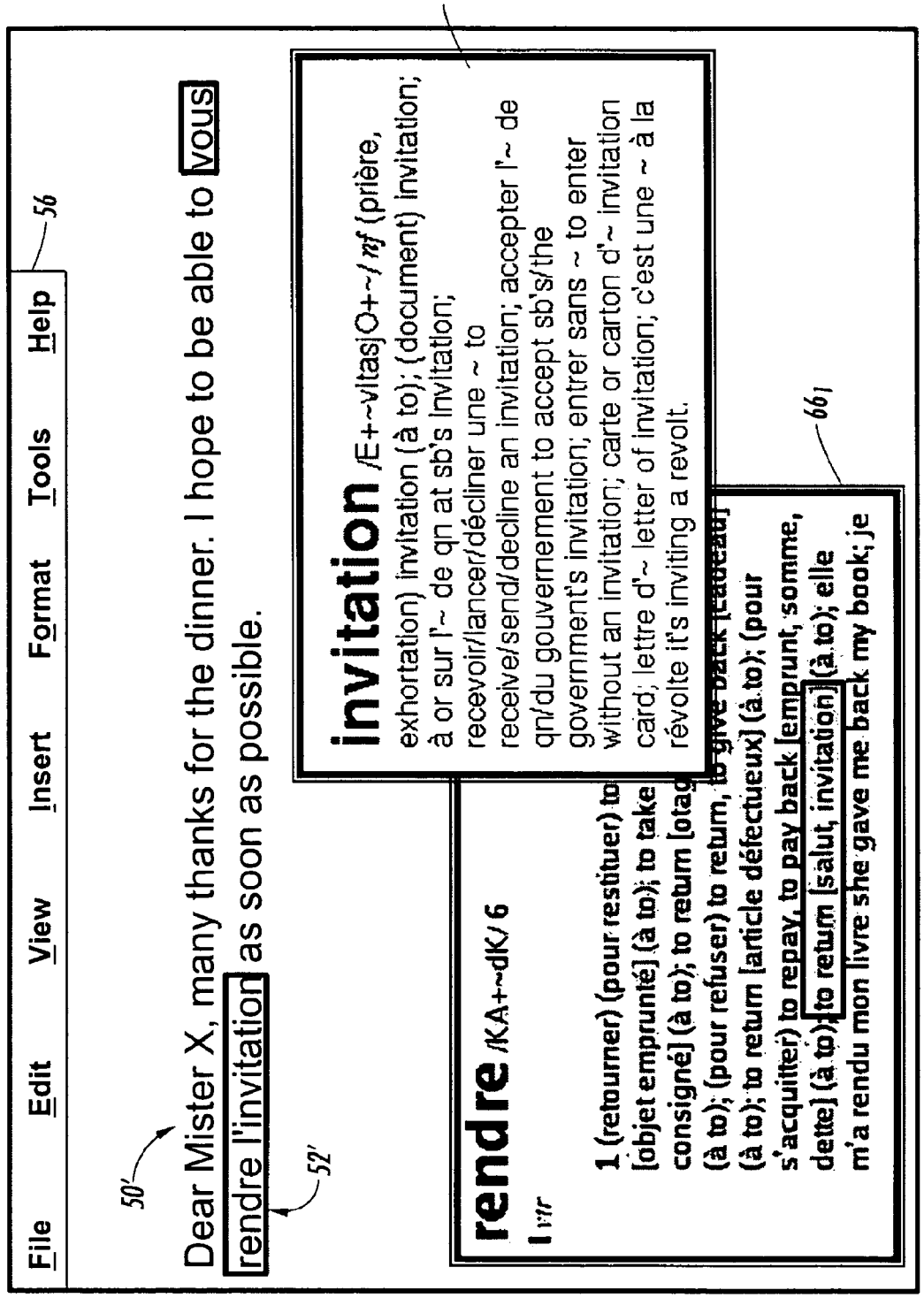
FIG. 5 shows yet another example word processing or text editing displays in which the authoring assistant has been accessed.

With reference to FIG. 5, consider the following partially translated text 50':

"Dear Mister X, many thanks for the dinner, I hope to be able to vous rendre l'invitation as soon as possible."

Upon highlighting or otherwise marking an untranslated text portion 52': "vous rendre l'invitation" in the text 50' and invoking the authoring assistant 30, the untranslated portion 52' is recognized as a multi-word expression providing context for monolingual semantic analysis. The process operation 84 is reached, and the French word "rendre" is looked up by the semantic dictionary lookup module 32. Here, the phrase "rendre une invitation" is not listed as a multiple word expression in the dictionary. However as seen in the first pop-up window 66$_1$, "Invitation" is listed as a collocate direct object of "rendre" in French in one of its meanings. As a consequence, the semantic dictionary lookup rules encode this knowledge and point out this particular sense and translation to the author in the pop-up window 66₁. Since the semantic dictionary lookup is applied on all words of the untranslated expression 52', it also displays in a second pop-up window 66₂ the French to English entry of "invitation" as well. Moreover, the output windows 66₁, 66₂ show the syntactic construction of the expression, which is helpful for the user in composing a suitable final sentence such as:

"Dear Mister X, many thanks for the diner, I hope to be able to return the invitation to you as soon as possible."

In another example, the semantic dictionary lookup module 32 provides a semantic matching, according to an ontology, in a case where a lexical match wasn't performed. Consider the example authored text:

"Dear Madam Y, <lang:french>je suis pris de remords</lang> for having declined your invitation but, etc."

In the untranslated expression "je suis pris de remords" (marked off in this example by the tags <lang:french> and <Ilang>), two candidates for disambiguation identified by the semantic dictionary lookup module 32 are "pris" (a verb), and "remords" (a noun). For the entry "pris", one example given is "etre pris de regrets", which is close to the expression but differs by substitution of the word "remords" for "regrets". Because the semantic dictionary lookup module 32 is provided with an ontology, it recognizes that "remords" and "regrets" are semantically close, and therefore points out to the author the relevant sub-entry. At this stage, the author could choose to compose the following phrase or phrases by combining the information of the two entries: "To be full with remorse" or "to be overcome with remorse", or by reading the entry of "remords", the author could also choose "feel some remorse for doing", which fits well with the context of the surrounding authored text. The semantic lookup provides the author with help to detect semantically relevant examples and translations; however, the composition process remains under the author's control. Moreover, the semantic dictionary lookup module 32 optionally gives examples of word constructions that might be helpful taken from the bilingual dictionary 34, and the author has the option of combining these constructions with a partial semantic match for the phrase 52' in the source language.

The context of the lookup is restricted to the source language phrase 52' that the author has typed in, and this is a small context. Since semantic dictionary lookup algorithms typically use examples and collocates of a dictionary to build the rules, they are particularly well suited to be applied on such small contexts.

In cases where the source language expression is a single word, there is no context for a monolingual semantic analysis performed in the source language. Accordingly, in such cases the decision operation 82 directs processing to the process operation 90 which finds possible translations based on the context provided by the surrounding or adjacent text in the target language.

Figure 6:
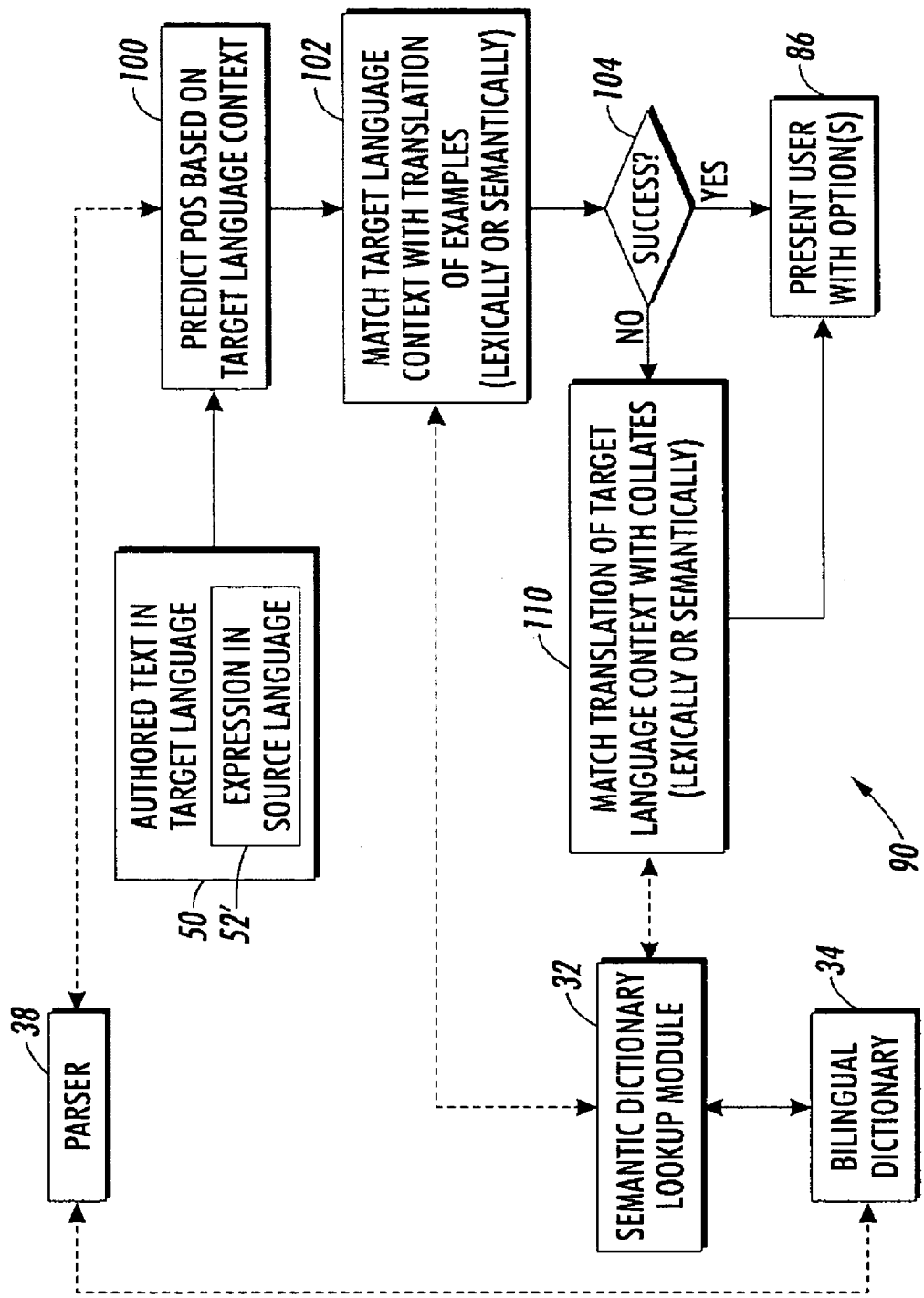
FIG. 6 flowcharts processing performed by the example authoring assistant of FIG. 1 when the source language expression provides insufficient context to perform a monolingual semantic analysis.

With reference to FIG. 6, a flow chart of the processing suitably performed in the process operation 90 of FIG. 4 is described. The surrounding or adjacent text in the target language is processed by the parser 38 to determine parts-of-speech of the target language text in a process operation 100. Typically, the parser 38 performs a lexical analysis and a syntactic analysis to identify the parts of speech, and may also perform limited semantic analysis such as disambiguating collocates identified in the bilingual dictionary 34. The parsing initially assigns an unknown category to the single word 52' in the source language; however, during syntactic and optional limited semantic analysis, the part-of-speech of the single word 52' in the source language may be narrowed or even unambiguously identified. In a process operation 102, the text matching module 40 of the authoring assistant 30 attempts to lexically or semantically match the surrounding or adjacent text in the target language with example source language contexts for the source language word 52' stored in the bilingual dictionary 34. In cases in which the parsing operation 100 unambiguously identified the part-of-speech of the source language word 52', a simple lexical analysis may be performed in which the target language translation of the source language word 52' having the unambiguously identified part-of-speech is selected as a proposed translation. In other cases, the text matching module 40 matches the target language context provided by the surrounding or adjacent text in the target language with translations of the example source language contexts provided by the bilingual dictionary 34. Synonyms in the target language for the words of the example source language contexts may be substituted in attempting to make the match. If the process operation 102 makes one or more successful matches, then in a decision operation 104 these matches are identified and are presented to the author as proposed translations in the process operation 86.

On the other hand, if the process operation 102 is unable to make any matches, then the decision operation 104 passes flow to a collate matching process operation 110. In the collate matching process, the collocation matching module 42 translates authored words in the target language back into the source language, and compares these translations with source language collates of the source language word 52' identified in the bilingual dictionary 34. The comparison can be purely lexical (comparing the literal dictionary entry with the translation of the surrounding context) or can include a semantic component by incorporating synonyms of the surrounding or adjacent words. If the collate matching process operation 110 identifies potential translations, these are proposed to the author in the process operation 86.

The processing 90 applies to a source language expression consisting of a single word. By single word, it is meant that the expression is restricted to one word of category Noun, Adjective, Adverb or Verb, ignoring the stop words. Having provided a general overview of suitable processing 90 performed by the authoring assistant 30 respective to a single word in the source language, some specific examples are next provided.

Consider the following partially translated text:

"I do not agree at all with the <lang:french>fond </lang> of your proposal, because"

Here, the text portion in the French source language is "fond", which is a single word providing no context for monolingual semantic analysis. Accordingly, the processing 90 is employed, starting with parsing of the surrounding text in the target English language. The parser 38 attempts to guess the part-of-speech of "fond" by assigning all principal categories (apart from stop words) to it and applying target (e.g., English) language tagging to the surrounding English context. The part-of-speech tagger of the parser 38 predicts the most probable part-of-speech category of the source word "fond". In the specific example, the part-of-speech tagger for English predicts "fond" is a noun. Once the noun category is determined, the process operation 102 matches the relevant dictionary entry, in the case the entry of the noun "fond" (and not the entry of the verb "fondre") and the authoring assistant 30 proposes this translation in the process operation 86.

As another example, consider the following partially translated text:

"We have to <lang:french>considérer</lang> our opponents with respect."

The parser 38 predicts that the part-of-speech of the source language word "considérer" is a verb. It also extracts the syntactic dependencies, in this particular example OBJECT (V?, opponent), and MODIFIER(V?,with,respect). In the French to English version of the bilingual dictionary 34, the entry of the verb "considérer" includes the example context "considérer un adversaire avec respect", which is translated by "to regard an opponent with respect". The translation of this example matches lexically and syntactically the English context of the surrounding English sentence: OBJECT(regard,opponent) and MODIFIER(regard,with,respect). Accordingly, the authoring assistant 30 highlights the corresponding part of the dictionary in a pop-up window. In this case, there is a lexico-syntactic match between the context of the sentence and the translation of the example.

As another example, consider the following alternative sentence containing the French word "considerer":

"We have to <lang:french>considérer</lang> our competitors with respect."

This sentence is identical to the previous sentence containing the word "considerer", except that the English word "competitors" replaces the English word "opponents." Similar methodology is applied, but additionally semantic context is considered. The matching operation 102 recognizes that the word "competitor" is a synonym to the word "opponent" used in the translation of the example source language context provided by the bilingual dictionary 34. Since "competitor" and "opponent" are close semantically (for example, in some lexicons the two words belong to the same semantic class), the matching operation 102 makes a semantic match between the surrounding target language text and the translation of the example source language context.

As another example, consider the following partially translated text:

"Next developments will <lang:fr>accentuer</lang> this trend in a drastic manner."

The parser 38 identifies the part-of-speech of the surrounding word "trend" as OBJECT(V?,trend). However, the matching operation 102 finds no example context translations in the dictionary 34 which match the surrounding authored English context. Accordingly, process flow passes to the collocate matching process operation 110. The processing 110 translates the argument of the source language word "accentuer", namely the English word "trend," and attempts to match the French translation with a collocate of the French word "accentuer" in the relevant syntactic dependency. French translations of "trend" provided by the bilingual dictionary 34 include: "tendance" and "mode". There is a lexical match between the collocate OBJECT(accentuer, tendance) and the corresponding English translation OBJECT(increase,trend), therefore the bilingual assistant highlights the relevant translation of "accentuer", namely the English word "increase".

As another example, consider the following partially translated text:

"Next developments will <lang:fr>accentuer</lang> this evolution in a drastic manner."

This example is identical to the previous example except that the English object "trend" has been replaced by the English word "evolution". The processing tries to match OBJECT (V?,evolution) with some information in the lexical entry of the source French word "accentuer". The word "evolution" is translated by "évolution" in French, according to the bilingual dictionary 34. Then the processing attempts to match object collocates semantically, according to a lexical ontology (such as EuroWordnet for French). In the example, the semantically closest words are "évolution" and "tendance", therefore the part of the dictionary corresponding to "increase" is again highlighted.

If the ontologies in the source (e.g., French) and target (e.g., English) languages are built according to the same hierarchy of semantic classes (for example, using Word Net and EuroWordnet), the translation of the collocates can be bypassed, and the collate matching 110 can perform the match at the semantic level using these parallel ontologies.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A bilingual authoring apparatus comprising:
 a user interface for inputting partially translated text including a text portion in a source language and surrounding or adjacent text in a target language;
 a bilingual dictionary associating words and phrases in the target language and words and phrases in a source language; and
 a context-sensitive translation tool communicating with the user interface, the context sensitive translation tool receiving the partially translated text and providing at least one proposed translation in the target language of the text portion in the source language, the at least one proposed translation in the target language being derived from the bilingual dictionary based on contextual analysis of at least a portion of the partially translated text, wherein the context-sensitive translation tool includes a semantic dictionary lookup module performing a monolingual contextual analysis of the text portion in the source language conditional upon the text portion in the source language including more than one word or category.

2. The bilingual authoring apparatus as set forth in claim 1, wherein the semantic dictionary lookup module further performs bilingual contextual analysis of the partially translated text conditional upon the text portion in the source language including only a single word or category.

3. The bilingual authoring apparatus as set forth in claim 1 wherein the context-sensitive translation tool includes:
 a parser;
 wherein conditional upon the text portion in the source language including only a single word or category, the context-sensitive translation tool applies the parser to the partially translated text to guess a part-of-speech of the text portion in the source language, the at least one proposed translation in the target language being selected from the bilingual dictionary to be consistent with the guessed part-of-speech.

4. The bilingual authoring apparatus as set forth in claim 3, wherein the bilingual dictionary stores example source language contexts including the text portion in the source language and corresponding target language translations, and the context-sensitive translation tool further includes:
 a bilingual text comparator that compares the corresponding target language translations with the surrounding or adjacent text in the target language, the at least one proposed translation including a corresponding target language translation that matches at least one of lexically and semantically with the surrounding or adjacent text in the target language.

5. The bilingual authoring apparatus as set forth in claim 3, wherein the bilingual dictionary stores source language collocations of the text portion in the source language, and the context-sensitive translation tool further includes:

a collocation comparator that (i) determines translations in the target language of the source language collocations using the bilingual dictionary, and (ii) compares the determined translations with the surrounding or adjacent text in the target language, the at least one proposed translation including a determined translation in the target language of a source language collocation that corresponds with the surrounding or adjacent text in the target language.

6. The bilingual authoring apparatus as set forth in claim 5, wherein the collocation comparator further (iii) identifies target language synonyms of the determined translations in the target language, the comparing (ii) further comparing the target language synonyms with the surrounding or adjacent text in the target language.

7. The bilingual authoring apparatus as set forth in claim 1, wherein the user interface includes:

a display showing authored text including at least the partially translated text; and a user input device for indicating the partially translated text and for sending the indicated partially translated text to the context-sensitive translation tool.

8. The bilingual authoring apparatus as set forth in claim 1, wherein the user input device is a pointing device, the user indicating the partially translated text by highlighting the partially translated text displayed on the display using the pointing device.

9. The bilingual authoring apparatus as set forth in claim 1, wherein the user interface is a word processor.

10. A bilingual authoring method comprising:

receiving from an associated user partially translated text including a text portion in a source language and surrounding or adjacent text in a target language;

identifying the partially translated text;

deriving at least one proposed translation in the target language of the text portion in the source language based on contents of a bilingual dictionary and contextual analysis of at least a portion of the partially translated text, wherein the deriving of at least one proposed translation in the target language includes performing a monolingual contextual analysis of the text portion in the source language conditional upon the text portion in the source language including more than one word or category, wherein the deriving is performed by a computer; and displaying the at least one proposed translation to the associated user.

11. The bilingual authoring method as set forth in claim 10, wherein the deriving of at least one proposed translation in the target language further includes:

performing a bilingual contextual analysis of the partially translated text conditional upon the text portion in the source language including only a single word or category.

12. The bilingual authoring method as set forth in claim 10, wherein the deriving of at least one proposed translation in the target language further includes:

determining that the text portion in the source language includes only a single word or category;

responsive to the determining, parsing the partially translated text to guess a part-of-speech of the text portion in the source language; and selecting the at least one proposed translation in the target language from translations provided in the bilingual dictionary that are consistent with the guessed part-of-speech.

13. The bilingual authoring method as set forth in claim 12, wherein the bilingual dictionary stores example source language contexts including the text portion in the source language and corresponding target language translations, and the deriving of at least one proposed translation in the target language further includes:

comparing the corresponding target language translations with the surrounding or adjacent text in the target language to identify at least one proposed translation as a corresponding target language translation matching at least one of lexically and semantically the surrounding or adjacent text in the target language.

14. The bilingual authoring method as set forth in claim 13, wherein the comparing further includes:

identifying target language synonyms of words of the corresponding target language translations in attempting to semantically match the corresponding target language translations and the surrounding or adjacent text in the target language.

15. The bilingual authoring method as set forth in claim 12, wherein the bilingual dictionary stores source language collocations of the text portion in the source language, and the deriving of at least one proposed translation in the target language further includes:

determining translations in the target language of the source language collocations using the bilingual dictionary;

comparing the determined translations with the surrounding or adjacent text in the target language to identify at least one proposed translation as a determined translation in the target language of a source language collocation corresponding with the surrounding or adjacent text in the target language.

16. The bilingual authoring method as set forth in claim 15, wherein the determining of translations further includes:

identifying target language synonyms of the determined translations in the target language.

17. The bilingual authoring method as set forth in claim 10, wherein the displaying of the at least one proposed translation to the associated user includes:

displaying at least a portion of an entry of the bilingual dictionary corresponding to a word of the text portion in the source language; and highlighting portions of the displayed entry corresponding to the at least one proposed translation.

* * * * *